United States Patent [19]

Garrett et al.

[11] 3,795,937

[45] Mar. 12, 1974

[54] METER CLEANER

[75] Inventors: Jim C. Garrett, 6331 Vera Crest Dr., Long Beach, Calif. 90804; Robert H. Johnson, 4764 "M" La Villa Marina, Marina Del Rey, Calif. 90291; Jack Shelton, 810 Rancho Dr., Long Beach, Calif. 90804; Ross E. Sherwood, Lakewood, Calif.

[73] Assignee: said Garrett, Johnson and Shelton, by said Sherwood

[22] Filed: Nov. 16, 1971

[21] Appl. No.: 199,280

[52] U.S. Cl. .............................. 15/256.51, 235/117

[51] Int. Cl. .............................. G06c 27/00

[58] Field of Search ............. 15/256.51, 256.5, 210, 15/97; 235/103, 79, 117, 118; 206/42; 40/111; 58/128; 116/133, 115

[56] References Cited

UNITED STATES PATENTS

| | | | |
|---|---|---|---|
| 1,409,196 | 3/1922 | Morton | 235/103 |
| 3,613,149 | 10/1971 | Gurkin | 15/256.51 |
| 2,399,538 | 4/1946 | Berry | 15/256.51 X |
| 901,784 | 10/1908 | Cordingley | 15/256.51 |
| 3,434,454 | 3/1969 | Ashton | 235/117 R |
| 3,588,476 | 6/1971 | Lapointe | 235/117 R |

*Primary Examiner*—Leon G. Machlin
*Attorney, Agent, or Firm*—Albert L. Gabriel

[57] ABSTRACT

The present invention relates to meters; and more particularly relates to the cleaning of meters of the type that have rotatable wheels with indicia on the periphery of the wheel. Under certain conditions, these indicia become dusty; and it then becomes necessary to clean them. The present disclosure teaches how this cleaning may be performed continuously and automatically.

17 Claims, 5 Drawing Figures

PATENTED MAR 12 1974 3,795,937

METER CLEANER

BACKGROUND OF THE INVENTION

In many cases, it is essential to count the number of times that a particular event occurs, and with the rapid trend toward automation, this counting activity becomes increasingly more important. While this counting procedure occurs in many industries, the following explanation will be presented in terms of a telephone operation, since this type of operation will be more readily understood than some others. However, it should be realized that this presentation is not to be construed as a limitation of the invention, but rather as one utilization thereof.

It is well known that each telephone call is routed through a telephone "central office" or "exchange," where the various telephone lines are switched, interconnected, and disconnected, and where various ringing signals and busy signals are generated, etc. It is also one of the important functions of the telephone exchange to count various activities, e.g., the number of calls made by each station, the number of times that certain lines are used, etc. Since this information is necessary for billing the subscribers, and for determining future needs and trends, etc., the counting must be precise and timely, and preferably as automated as possible.

In order to accomplish this counting function, the telephone exchange includes a "bank" of counting meters that are activated by selected signals, so that the meters record the accumulated data. It has become most efficient to photograph the bank of meters, and to have the resultant photograph readout either manually or by computer-controlled apparatus. Therefore, the counting meters have tended toward the use of a meter face that displays actual digital numerals.

For many technical reasons, these meters should be low-powered. Additionally, they should preferably be made in such a way that they are in a substantially closed environment that includes a viewing window for exposing the meter readings.

Unfortunately, regardless of the type of window pane material used, the meter readings are not always clearly photographed because of light loss from reflection. Therefore, it has become advantageous to remove the meter window pane for the purpose of photography, this remedy, unfortunately, permitting dust to enter the meter cases, which can cause interference with operation of the delicate meter mechanism, and can obscure the numbers exposed at the face of the meter. With the meter window panes thus removed, repeated cleaning of the number wheels becomes necessary to permit good photographic recording without obscuration from dust. Such meter cleaning operation is, of course, a delicate and time-consuming operation, and is quite objectionable.

OBJECTS AND DRAWINGS

It is therefore the principal object of the present invention to provide an improved meter.

It is another object of the present invention to provide an improved meter that facilitates the photographing of the meter faces.

It is still another object of the present invention to provide an improved meter cleaner.

It is a further object of the present invention to provide an improved meter cleaner that is adapted to be retrofitted to existent meters.

It is a still further object of the present invention to provide an improved meter cleaner that may be used on practically all currently used telephone-type meters.

Attainment of these objects and others will be realized from the following description, taken in conjunction with the drawings, of which:

SYNOPSIS

Figures 1, 2, 3, 4, 5:
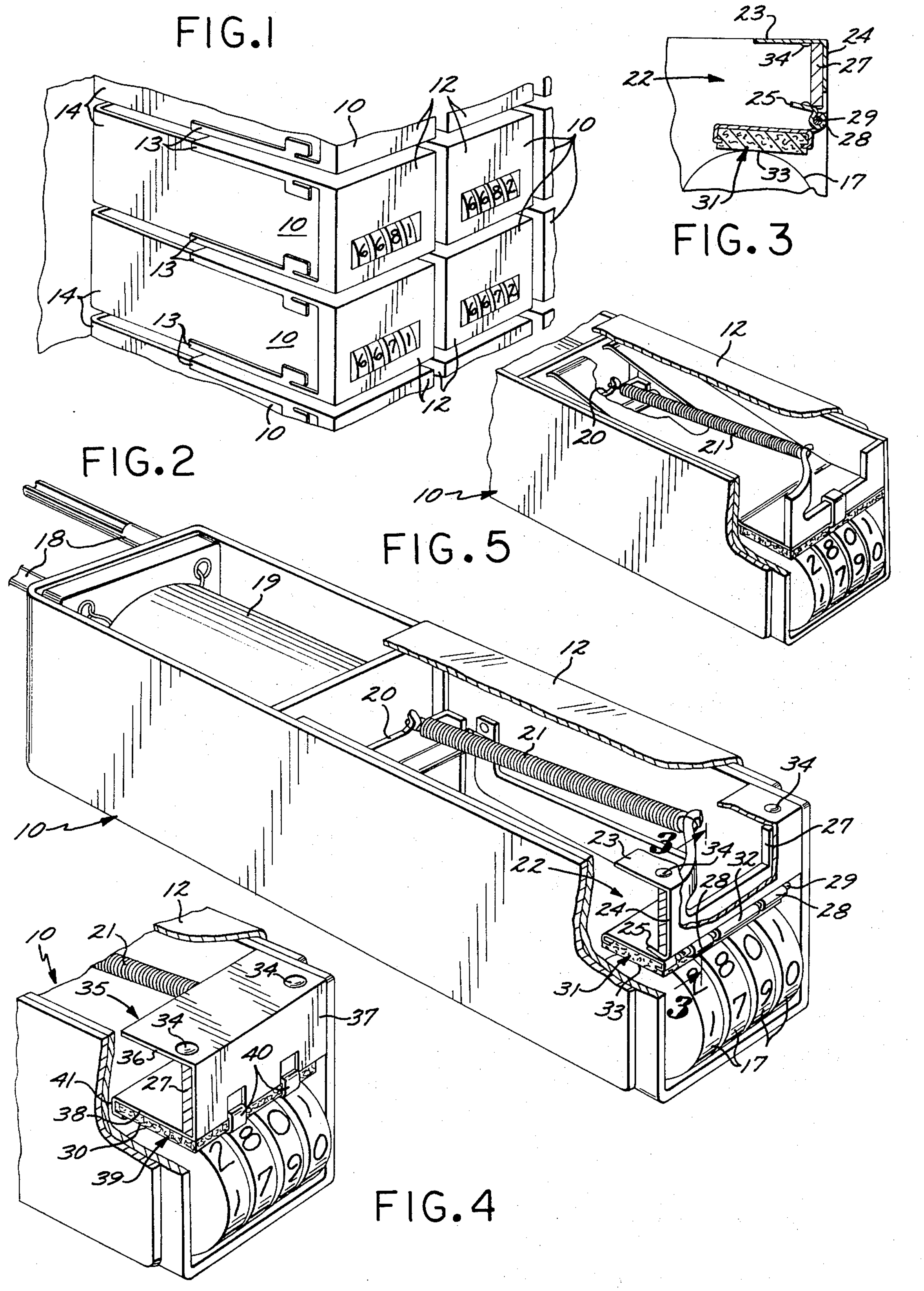
FIG. 1 shows a pictorial view of a portion of a bank of meters.
FIG. 2 shows a pictorial cut-away view of one type of meter cleaner.
FIG. 3 is a fragmentary vertical section taken on the line 3—3 in FIG. 2.
FIG. 4 shows a pictorial cut-away view of another type of meter cleaner.
FIG. 5 shows a pictorial cut-away view of still another type of meter cleaner.

The present application discusses how certain meters having number wheels with indicia on their peripheries are used, and how certain usages cause dust to collect on the indicia. The disclosure teaches that a meter cleaner may be mounted in such a way that a cleaner pad continually engages the indicia surfaces in a gentle, resilient manner. Thus, as the number wheels rotate, the dust is brushed away from the indicia on the periphery of the wheels.

Several embodiments of the invention are discussed, these being useful for telephone-type meters, and a preferred type of cleaner pad is described.

DESCRIPTION

Introduction

The general problem will be understood from FIG. 1. This shows a portion of a bank of meters 10 such as may be used as traffic use recorders, pay-count registers, trunk usage indicators, and the like. Each of these meters 10 contains a meter identification number, and it will be seen that each digital meter reading is visible through a window 11 that is part of a removable dust cover 12. Each dust cover is easily removed, when necessary, by pulling it forward, friction fingers providing a snug fit of the dust cover 12 onto the body 14 of the meter 10. Thus, when the window panes are removed from the bank of meters, the various meter faces may then be photographed through the now open windows, but this permits the ingress of dust, as discussed above.

Attention is now directed to the pictorial cut-away view of FIG. 2, this showing a meter 10 with its dust cover cut away to show the inside of the meter. It will be seen that meter 10 has a face that is formed by a plurality of peripherally-marked rotatable "number wheels" 17.

In the disclosed meter 10, an electrical activating signal is applied through terminals 18, and thence through a solenoid winding 19, which thereupon becomes a magnet. The resultant magnetic force moves an armature 20, which in turn retracts a pawl 50 having a hooked forward end that engages a structure such as a ratchet wheel attached to the rightmost number wheel 17.

The activating signal is produced only momentarily, and at its termination, the magnetic force disappears. A retraction spring 21 thereupon restores the pawl 50 to its normal position, meanwhile advancing the rightmost number wheel one step in a pawl ratchet manner. The meter is now ready for another activating signal.

Thus, each activating signal rotates the rightmost number wheel one step, and when this rightmost number wheel has rotated ten steps, it advances its adjacent number wheel one step, etc. In this way, the plurality of number wheels of meter 10 accummulates the desired information, and displays this information in digital form on the meter face.

DESCRIPTION

Basic Concept

As indicated above, the removal of the window pane permits the ingress of dust, and this dust tends to accumulate on the peripheries of the number wheels, thus obscuring the numbers that should be in clear sight.

With the operation and the problem of the meter in mind as presented above, the basic inventive concept may now be understood by referring again to FIG. 2. This shows a meter cleaner 22 that is formed of a springy sheet material (such as beryllium-copper or the like). Meter cleaner 22 is of a substantially channel-shaped configuration, having an upper shelf 23, a front 24, and a bottom shelf 25, the shelves 23 and 25 being interconnected by the front 24, and being spaced apart substantially the same distance as the vertical height of the crossbar structure 27 of the meter body 14.

The lower shelf 25 is shortened, and one or more small frontal sections thereof are rolled back upon themselves to form one or more tubular sleeves 28 that are adapted to accept a hinge pin 29.

Meter cleaner 22 also has a pad retainer portion 31, and one or more small frontal sections thereof are similarly rolled back upon themselves to form one or more tubular sleeves 32 that are also adapted to accept the hinge pin 29. Thus, the pad retainer 31 is hingedly attached to the lower shelf 25 of the meter cleaner 22.

As shown in FIG. 2, a cleaner pad 33 is attached to the lower exterior surface of the pad retainer 31, being held in this location by means of holding clips, one or more longitudinal ledges, one or more transverse ledges, adhesives, bolts, and/or the like.

When the meter cleaner 22 is assembled by sliding the hinge pin 29 into the aligned sleeves 28, 32, 28, the assembly appears as indicated in FIGS. 2 and 3.

Installation and Operation

The disclosed meter cleaner 22 is installed from the front of the meter, and is placed thereon by pushing the upper and lower shelves 23 and 25 over the crossbar structure 27, or portions thereof, depending upon the structure of the particular meter body. As the meter cleaner 22 is snapped into place on the crossbar structure 27, suitable detents, such as "dimples," hold the meter cleaner 22 onto the meter body 14 onto which the number wheels 17 are also mounted, thus providing spatial stability. Now, under the action of gravity, the weight of the cleaner pad 33, and the weight of the pad retainer 31 cause the cleaner pad to lightly engage the peripheries of the number wheels 17. In this way, the engagement between the cleaner pad 33 and the number wheels 17 cleans the number wheel peripheries without producing any appreciable loading effect on the meter, thus permitting the use of low-powered meters. Relatively loose-fitting parts may be provided in the hinge structure so that the cleaner pad will automatically laterally adjust to a substantially uniform cleaning pressure on the plurality of number wheels in the meter.

The Cleaner Pad

It has been found that an eminently satisfactory cleaner pad 33 may be made from a material described in U.S. Pat. No. 3,187,362, and designated as "Nylovel Knap," this material being available from ABC Company, St. Louis, Mo., in the form of sheets. This material is formed of vinyl backing about 0.015 inches thick, and has a nap that is about 0.067 inches long, so that the nominal thickness of the cleaner pad is about 0.082 inches; and may be cut to any desired size.

The pad retainer 31 may therefore be made to accommodate this thickness, and the cleaner pad 33 is clamped or otherwise attached to the pad retainer 31. This particular pad material has undergone two million cycles of test operation, and still shows no appreciable signs of wear, while still continuing to satisfactorily clean the number wheels.

Other pad materials have a centered backing, with nap on both sides thereof. This particular type of material lends itself to the use of a pad retainer that permits the cleaner pad to be either replaceable or reversible. However, as indicated above, the present cleaner pad is so satisfactory and so long lived that such a reversal or replacement is deemed unnecessary.

A Second Embodiment

FIG. 4 shows a second embodiment of the subject meter cleaner. Meter cleaner 35 of FIG. 4 is also of a substantially channel-shaped configuration, having an upper shelf 36, a front portion 37, and a lower shelf 38. Here too, the upper shelf 36 and the lower shelf 38 are interconnected by the front portion 37, and are spaced apart substantially the same distance as the vertical height of the crossbar structure 27.

In the embodiment of FIG. 4, the lower shelf 38 forms a pad retainer 39, the cleaner pad 33 being attached to the lower exterior surface of the pad retainer 39 by any suitable means, as discussed above.

Meter cleaner 35 is installed in a similar manner to the one described above, by having its shelves 36 and 38 pushed over the crossbar structure 27 until detents 34 snap into place behind the crossbar structure 27. In this way, the meter cleaner 35 is resiliently held in place with the cleaner pad resiliently engaged with the peripheries of the number wheels 17. The engagement pressure is uniform and constant, dependent upon the spring characteristics of the thin sheet material of which the channel-shaped unit is made, and upon the overall configuration and mounting thereof.

Another Embodiment

FIG. 5 shows a pictorial cut-away view of still another embodiment of the subject meter cleaner. Meter cleaner 44 has a longitudinal spring portion 45 whose distal end is forked to straddle the previously discussed spring 21, and whose proximal end forms a pad retainer 46 that carries the above described cleaner pad 33. Thus, the spring portion 45 of the meter cleaner 44 acts in the lower-shelf manner of the foregoing embodiments; the cleaner pad 33 being suitably attached to the lower exterior surface thereof.

Meter cleaner 44 is installed by inserting the front end of its spring portion 45 under the crossbar structure 27, a holding clip 47 snapping onto the crossbar structure. At this time, the cleaner pad 33 of the pad retainer 46 assumes a resiliently fixed position adjacent to the peripheries of the number wheels 17, the cleaner pad 33 resting lightly on the number wheels. The holding clip 47 and the cleaner pad 33 coact to hold the meter cleaner 33 in this position until the dust cover 12 is replaced. At that time, the inside surface of the dust cover 12 presses downwardly on the distal ends of the spring portion 45; thus, the spring portion 45 provides the resilient holding force that holds the cleaner pad 33 resiliently against the peripheries of the number wheels 17.

SUMMARY

The disclosed meter cleaner improves the usefulness of the meter in a number of ways. First of all, it continuously cleans the meter numbers as the meter is used. Secondly, it brushes off the dust that collects on the peripherally placed numbers on the number wheels. Third, it assures a clear legible readout, especially by photocopy records. Fourth, it reduces the possibility of mis-reading the meter. Fifth, it is easily installed. Sixth, it permits easy retrofitting onto existent meters, without modifying the meter in any way. Seventh, it does not interfere with normal meter operation. Eighth, it cannot become loosened. Ninth, it is useful for more than two million operations of the meter. And finally, it does not require any attention or maintenance.

While the instant invention has been shown and described herein in what are conceived to be the most practical and preferred embodiments, it is recognized that departures may be made therefrom within the scope of the invention.

We claim:

1. The combination comprising:

means, comprising cleaning pad means adapted to engage the peripheries of a plurality of rotatable number wheels, for cleaning the peripheries of said number wheels that are in engagement with said cleaning pad means; and pivotally mounted, resiliently movable holding means for resiliently holding said cleaning pad means in gentle engagement with said rotatable number wheels.

2. The combination of claim 1 including spring means for providing said gentle resilient engagement.

3. The combination of claim 1 including gravity means for providing gentle resilient engagement.

4. The combination of claim 1 including a common support means for supporting both said cleaning pad means and said rotatable number wheels.

5. The combination comprising:

means, comprising a cleaning pad adapted to lightly engage the peripheries of a plurality of rotatable number wheels, for cleaning said peripheries of said number wheels that are in engagement with said cleaning pad;

holding means, including a common support means supporting both said cleaning means and said plurality of number wheels, for holding said cleaning means in said light engagement with said rotatable number wheels.

6. The combination of claim 5 including spring means for providing said engagement.

7. The combination of claim 5 including gravity means for providing said engagement.

8. The combination of claim 5 wherein said holding means comprises means for positioning said cleaner pad in a substantially fixed, resilient manner.

9. In combination with a meter having a plurality of rotatable number wheels and a crossbar structure, a meter cleaner comprising:

a channel-shaped member formed of spring material;

said member having an upper shelf, a lower shelf, and a front portion interconnecting said two shelves;

said shelves being spaced apart by a distance that is substantially equal to the width of said crossbar structure;

means for attaching said channel-shaped meter cleaner to said crossbar structure;

a cleaner pad retainer associated with said lower shelf of said meter cleaner;

a cleaner pad;

means for affixing said cleaner pad to said cleaner pad retainer;

whereby said cleaner pad is in engagement with the peripheries of said plurality of rotatable number wheels, and cleans said peripheries as said number wheels rotate.

10. The combination of claim 9 wherein said cleaner pad retainer is a unitary part of said lower shelf of said meter cleaner.

11. The combination of claim 9 wherein said cleaner pad retainer is hingedly attached to said lower shelf.

12. The combination of claim 9 wherein said means for attaching said meter cleaner to said crossbar structure comprises a clip.

13. The combination of claim 9 wherein said means for attaching said meter cleaner to said crossbar structure comprising a plurality of detents associated with at least one of said shelves.

14. The combination of claim 9 wherein said cleaner pad affixing means comprises clips.

15. The combination of claim 9 wherein said cleaner pad affixing means comprises at least one ledge.

16. The combination of claim 9 wherein said cleaner pad affixing means comprises a longitudinal ledge.

17. The combination of claim 9 wherein said cleaner pad affixing means comprises at least one transverse ledge.

* * * * *